United States Patent [19]

Arp

[11] Patent Number: 4,919,880
[45] Date of Patent: Apr. 24, 1990

[54] CORE PINCH-OFF FOR BLOW MOLDING PARISON

[76] Inventor: George F. Arp, 27 Terrace Villa Cir., Fairport, N.Y. 14450

[21] Appl. No.: 895,329

[22] Filed: Aug. 11, 1986

Related U.S. Application Data

[63] Continuation-in-part of Ser. No. 868,294, May 28, 1986.

[51] Int. Cl.⁵ .................. B29C 49/18; B29C 49/30; B29C 49/04
[52] U.S. Cl. .................................. 264/536; 264/515; 264/540; 425/297; 425/468; 425/469
[58] Field of Search ............... 264/529, 531, 532, 528, 264/536, 537, 539, 540, 515; 425/296, 297, 302.1, 305.1, 527, 531, 532, 468, 469

[56] References Cited

U.S. PATENT DOCUMENTS

| | | | |
|---|---|---|---|
| 3,507,942 | 4/1970 | Lynch | 264/540 |
| 3,579,622 | 5/1971 | Shaw et al. | 264/531 |
| 3,806,587 | 4/1974 | Turner | 425/531 |
| 3,861,845 | 1/1975 | Butcher | 425/531 |
| 3,865,531 | 2/1975 | Moore et al. | 425/531 |

FOREIGN PATENT DOCUMENTS 911228  11/1962  United Kingdom ............... 264/536

*Primary Examiner*—James Lowe
*Assistant Examiner*—Neil M. McCarthy

[57] ABSTRACT

A pinch-off clamp 20, built into a top 12 of a hollow core 11 within a blow molding machine 10, has jaws 21 and 22 that open to receive a leading end 18 of a parison 15, which descends into the hollow core. Then jaws 21 and 22 close together to pinch off and hold a leading region of parison 15 at top of core 11. Once parison 15 is pinched off and held closed, it can be ballooned and draped over core 11 and then blown into a double-walled box formed between the core and cavity mold parts closed around the core.

10 Claims, 5 Drawing Sheets

CORE PINCH-OFF FOR BLOW MOLDING PARISON

This sole application is a Continuation-In-Part of a copending joint parent application Ser. No. 868,294, filed 28 May 1986, entitled DRAPED PARISON BLOW MOLDING.

BACKGROUND

In the invention of our parent application, we discovered that a deep, double-walled box can be blow molded from a single parison that is closed and draped downward over a core so that a leading portion, next to the core, becomes an inside wall of the box, and a succeeding portion, surrounding the core, becomes an outside wall of the box. We balloon the parison to a size larger than the core as we invert and drape the parison down over the core. Outer mold parts then close around the parison draped over the core, and the parison is blown in the cavity between the core and the outer mold parts to form a double-walled box that is unlimited in depth.

In making the invention of the parent application work, I discovered a way of pinching closed and holding a lower region of the parison in place at the top of the core so that the parison can be ballooned as it drapes down over the core and can be held reliably in place during the draping. My device for accomplishing this is built into a core and is simple, effective, and economical to facilitate parison draping in a blow molding machine.

SUMMARY OF THE INVENTION

My pinch-off device includes a pinch-off clamp movable between an open and closed position at the top of a hollow core arranged under the parison for receiving a leading end of the parison. I at least partially close the parison above the pinch-off clamp and direct the leading end of the parison through the open clamp and into the hollow interior of the core. Then I close the clamp to pinch off the lower region of the parison above its leading end and hold this in place while the parison is ballooned, lowered, and draped over the core. My pinch-off device can also sever and remove leading end waste from the portion of the parison within the hollow core.

DRAWINGS

DETAILED DESCRIPTION

Figure 1:
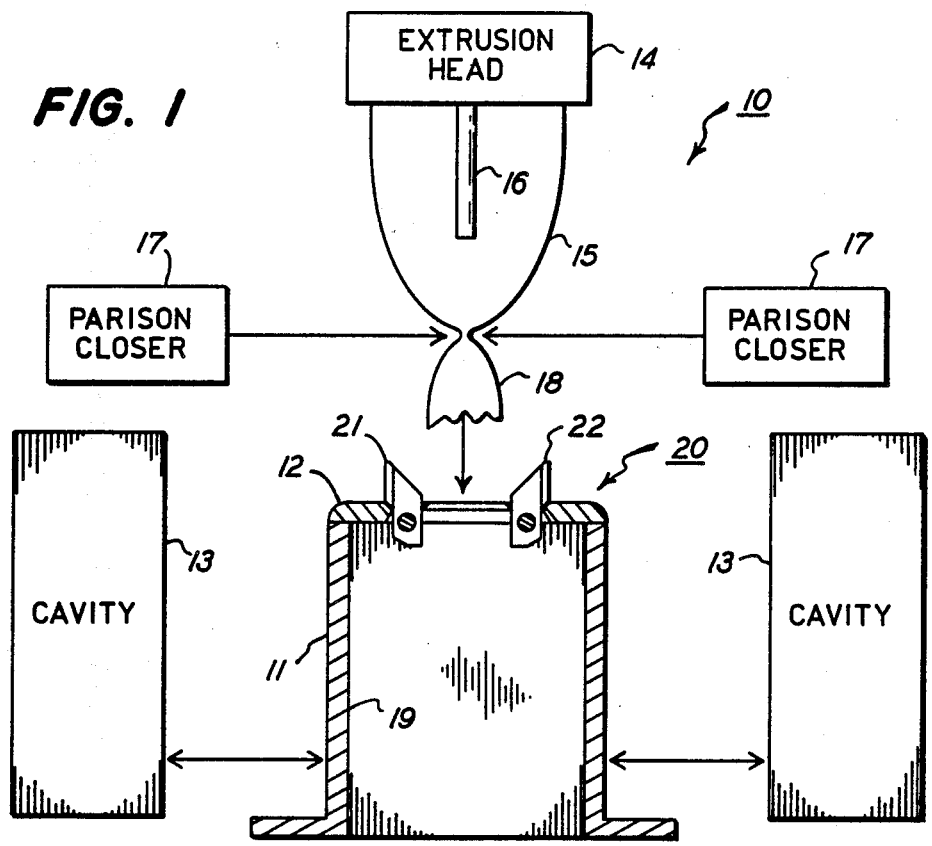
FIG. 1 is a schematic view of a blow molding machine having a core pinch off according to my invention.
Figure 2:
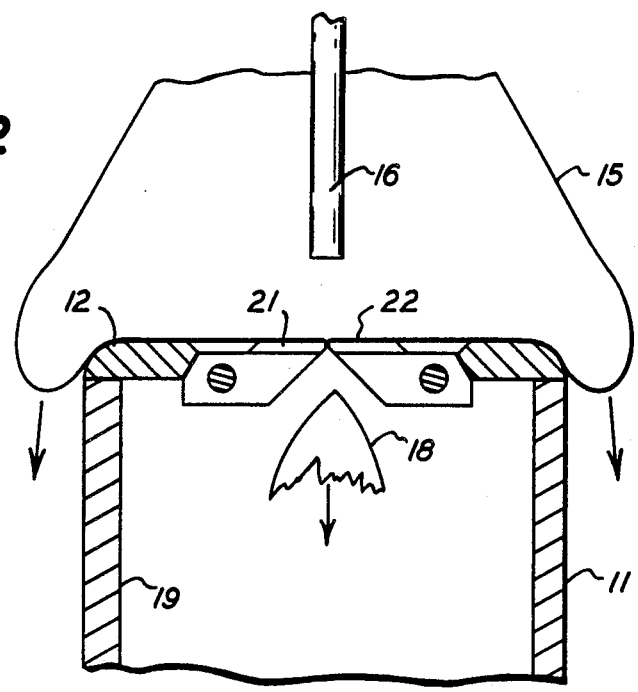
FIG. 2 is a schematic view, similar to the view of the core and parison portion of FIG. 1, showing the parison pinched off and held at an upper region of the core.

My pinch-off device 20 is arranged at the top 12 of a core 11 in a blow molding machine 10 that also includes a pair of cavities 13 and an extrusion head 14 for producing and lowering a parison 15. A blow pin 16 extends downward from extrusion head 14 within parison 15 and is preferably movable vertically for ballooning, deballooning, and blowing parison 15 into a deep, double-walled box. Parison closers 17 preliminarily close or pinch together a leading end 18 of parison 15 as the parison lowers toward my pinch-off device 20. Opposed jaws 21 and 22 of clamp 20 extend along the top 12 of core 11 and when open, as shown in FIG. 1, receive the leading end 18 of parison 15 as it lowers between the clamp jaws and into a hollow interior 19 of core 11. Jaws 21 and 22 then close as shown in FIG. 2 for pinching off and holding securely in place a lower region of parison 15. Air from blow pin 16 can then balloon parison 15 to a size larger than core 11 so that as parison 15 lowers further, it begins to drape down over core 11 as shown in FIG. 2. Much more information on the parison draping process, including ballooning, deballooning, lubricating, and blowing the draped parison is in our parent application.

Figure 3:
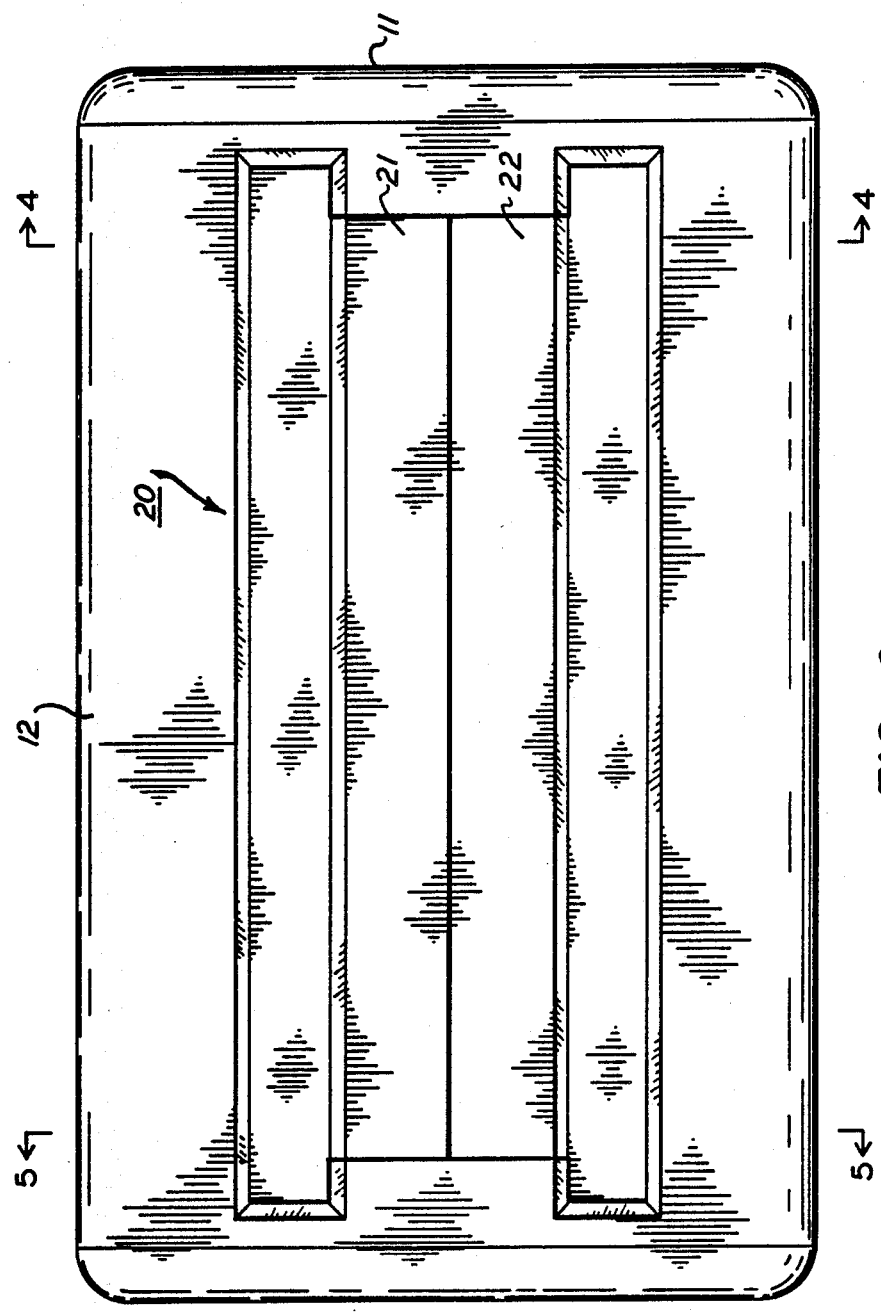
FIG. 3 is a top view of a preferred embodiment of a core with a closed pinch-off clamp usable in the blow molding machine of FIGS. 1 and 2.
Figure 4:
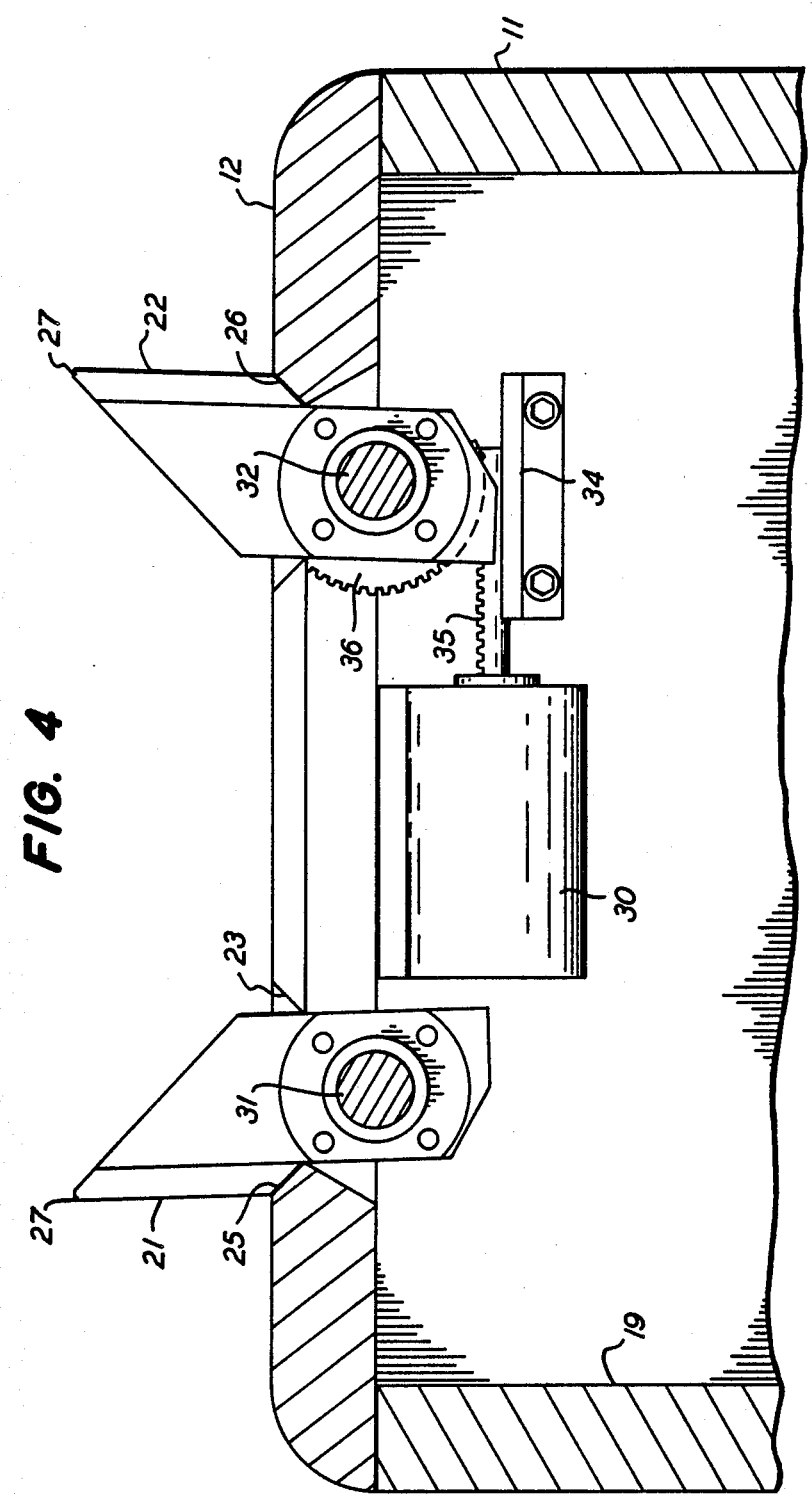
FIG. 4 is a fragmentary cross-sectional view of the core top of FIG. 3 with the clamp jaws open, taken along the line 4—4 thereof.
Figure 5:
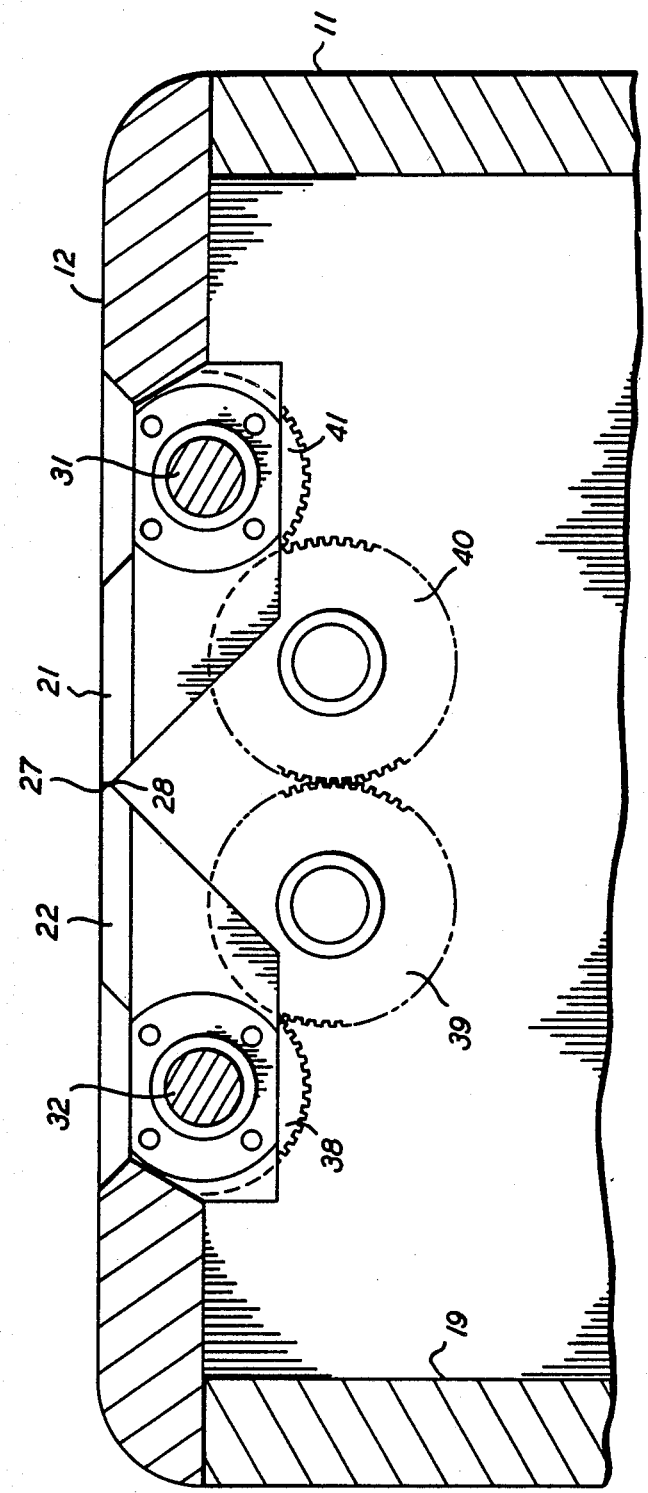
FIG. 5 is a fragmentary cross-sectional view of the core top of FIG. 3 with the clamp jaws closed, taken along the line 5—5 thereof.

My preferred way of making pinch-off clamp 20 is best shown in FIGS. 3–5. When jaws 21 and 22 are closed as shown in FIGS. 3 and 5, they form a portion of the top 12 of core 11; and when jaws 21 and 22 are fully open as shown in FIGS. 1 and 4, their abutment surfaces 23 and 24 engage stop surfaces 25 and 26 on core top 12. The mechanism for moving the jaws between these positions is best shown in FIGS. 4 and 5.

Clamp jaws 21 and 22 pivot respectively on shafts 31 and 32 that extend longitudinally within hollow core 11 between opposite end regions. A pinion 36 mounts on shaft 32 at the end of core 11 shown in FIG. 4, and a hydraulic cylinder 30 operates a rack 35, meshed with pinion 36, and movable in rack guide 34. As hydraulic cylinder 30 pulls rack 35 inward, this rotates pinion 36, shaft 32, and clamp jaw 22 to the open position. At the other end of core 11, shown in FIG. 5, shaft 32 carries a gear 38 that meshes with idler gear 39, which in turn meshes with idler gear 40, which meshes with gear 41 on shaft 31 on which clamp jaw 21 mounts. Gear train 38–41 transmits the rotation of shaft 32 and clamp jaw 22 to shaft 31 and clamp jaw 21 so that both clamp jaws move in complementary unison between opened and closed positions. The meeting edges of clamp jaws 21 and 22 are preferably shaped to form both a notch 27 for holding pinched-off resin from parison 15 along a narrow line across the top of core 11 and also cutting edges 28, below notch 27, for severing off a waste leading end 18 of parison 15 so that the severed waste 18 can drop downward and out of the way through hollow core 11. By locating all the clamp opening and closing mechanisms at end regions of core 11, I keep a large central region open and unobstructed for receiving parison 15. The single hydraulic cylinder 30 that works my pinch-off device 20 is readily operated hydraulically or pneumatically under the control system of a blow molding machine; and because of their geared connection, both clamp jaws respond reliably.

Figure 6:
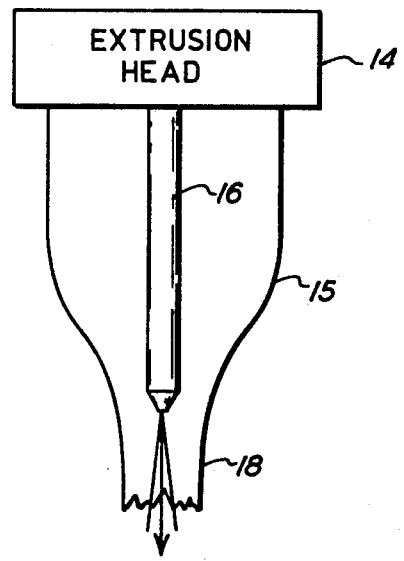
FIG. 6 is a schematic side elevational view of one preferred embodiment of preliminary parison closer.

To ensure that parison 15 will fit between clamp jaws 21 and 22 as it lowers into the top 12 of core 11, I provide a preliminary parison flattening or closing device above the top of core 11. One alternative for this, shown in FIG. 6, is a blast of air directed downward from blow pin 16 through the open bottom of parison 15, where it reduces the internal pressure and collapses the leading end 18 of the parison wall. The partially collapsed parison end 18 can then fit between clamp jaws 21 and 22 as it lowers into hollow core 11 so that clamp 20 can close and pinch off a region of parison 15 above leading end 18.

Figure 7:
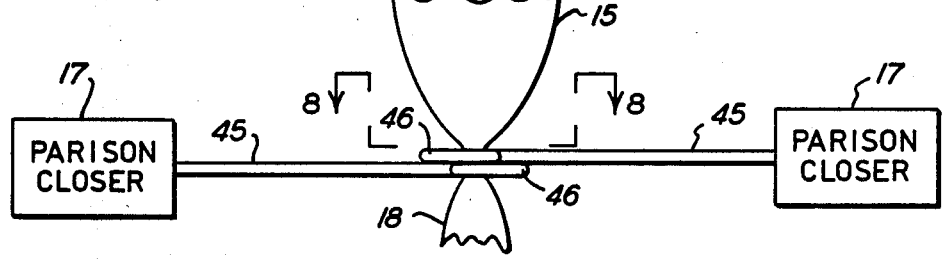
FIG. 7 is a side elevational view of another preferred embodiment of preliminary parison closer, shown in a closed position.
Figure 8:
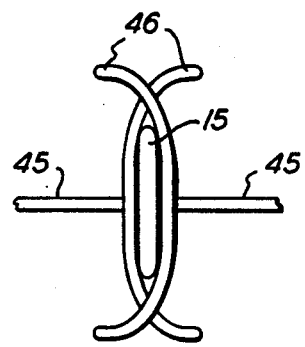
FIG. 8 is a fragmentary cross-sectional view of the core closer of FIG. 7, taken along the line 8—8 thereof.

Another alternative for partially flattening or closing leading end 18 of parison 15 is shown in FIGS. 7 and 8. This includes parison closers 17 (also illustrated in FIG. 1) for moving closure rods 45 toward and away from parison 15, preferably under hydraulic control. Closure rods 45 have bow-shaped ends 46 that overlap when closed adjacent parison 15 for flattening leading end 18 to a bunched and tacked together form. Parison closers 17 then open, moving rods 45 and bows 46 clear of parison 15, which lowers its collapsed leading end 18 reliably through the space between open clamp jaws 21 and 22.

I claim:

1. Apparatus for pinching off a blow molding parison, said apparatus comprising:
   a. a core arranged between openable and closeable blow mold parts, which blow mold parts, upon closing around said core, form a cavity in which said parison can be blown in a double-walled form conforming to an outside surface of said core and an inside surface of said cavity;
   b. said core having a hollow interior arranged under said parison for receiving a leading end of said parison;
   c. a top region of said core having a pinch-off means including clamp jaws that are mounted on said core for movement relative to said core between an open and a closed position of said clamp jaws;
   d. means for directing said leading end of said parison through said clamp jaws and into said hollow interior while said clamp jaws are in said open position;
   e. means for moving said clamp jaws relative to said core from said open position to said closed position for closing said clamp jaws to pinch off and hold said leading region of said parison at said top region of said core while a following region of said parison lowers over said top region of said core; and
   f. said pinch-off clamp jaws being arranged in said closed position to form an upper portion of said outside surface of said core, against which said parison conforms when blown.

2. The apparatus of claim 1 wherein said means for directing said leading end of said parison includes means for collapsing said leading end of said parison by directing an air stream through said leading end of said parison.

3. The apparatus of claim 1 wherein said means for directing said leading end of said parison includes a parison flattener that closes against said leading end of said parison to collapse said parison sufficiently to fit within said clamp.

4. The apparatus of claim 1 wherein said pinch-off means includes means for cutting off said leading end of said parison adjacent a pinch-off region.

5. A method of pinching off and holding a leading region of a blow molding parison, said method comprising:
   a. arranging on a top region of a hollow core a pinch-off clamp including clamp jaws movable away from and toward each other between respective open and closed positions relative to said top region of said hollow core disposed between openable and closeable blow mold parts, which blow mold parts, upon closing around said core, form a cavity for blow molding said parison to conform to an outer surface of said core and an inner surface of said cavity;
   b. directing a leading end of said parison into said pinch-off clamp while said pinch-off clamp is in an open position;
   c. moving said clamp jaws toward each other on said top region of said core for closing said pinch-off clamp jaws against said leading region of said parison for closing and holding said parison at said top region of said core while a succeeding region of said parison lowers over said outer surface of said top region of said core; and
   d. forming said pinch-off clamp so that, in a closed position, said pinch-off clamp forms an upper portion of said outer surface of said core.

6. The method of claim 5 including blowing air through said leading end of said parison to collapse said leading end of said parison for fitting said parison through said clamp.

7. The method of claim 5 including pinching said leading end of said parison closed before said parison reaches said clamp so that said pinched closed parison can fit through said clamp.

8. The method of claim 5 including cutting off said leading end of said parison with said pinch-off clamp.

9. A blow molding core arranged between openable and closeable blow mold parts, which blow mold parts, upon closing around said core, form a cavity so that a blow molding parison can be blown to conform to an outer surface of said core and an inner surface of said cavity, said core comprising:
   a. a pinch-off clamp including clamp jaws movable relative to said core between an open and closed position arranged on a top region of said core under said parison and above a hollow interior of said core;
   b. said clamp jaws of said pinch-off clamp being movable away from each other to said open position on said core for receiving a leading end of said parison advancing through said clamp and into said hollow interior;
   c. said clamp jaws of said clamp being movable toward each other to said closed position on said core wherein said clamp pinches off and closes a lower region of said parison above said leading end and holds said lower region of said parison at said top region of said core while a following region of said parison lowers over said core; and
   d. top surfaces of said clamp conforming to said outer surface of said core at said top region of said core when said clamp is in said closed position.

10. The core of claim 9 wherein said clamp includes means for cutting off said leading end of said parison.

* * * * *

UNITED STATES PATENT AND TRADEMARK OFFICE
CERTIFICATE OF CORRECTION

PATENT NO.  : 4,919,880

DATED       : April 24, 1990

INVENTOR(S) : George F. Arp

It is certified that error appears in the above-identified patent and that said Letters Patent is hereby corrected as shown below:

Title page, first column, delete "[76]" and insert --[75]--; after George F. Arp, delete "27 Terrace Villa Cir., Fairport, N.Y. 14450" and insert --Rochester, N.Y.--; and add --[73] Assignee: John D. Brush & Co., Inc., Rochester, N.Y.--. Title page, second column, after Neil M. McCarthy, add --Attorney, Agent, or Firm—Stonebraker, Shepard & Stephens--.

Signed and Sealed this

Fourteenth Day of January, 1992

Attest:

HARRY F. MANBECK, JR.

*Attesting Officer*     *Commissioner of Patents and Trademarks*